(12) United States Patent
Liu

(10) Patent No.: US 7,176,597 B2
(45) Date of Patent: Feb. 13, 2007

(54) ELECTROMAGNETIC RETARDER FOR A VEHICLE

(75) Inventor: Zeng Gang Liu, Maurecourt (FR)

(73) Assignee: Telma, Saint-Ouen-l'Aumone (FR)

( * ) Notice: Subject to any disclaimer, the term of this patent is extended or adjusted under 35 U.S.C. 154(b) by 0 days.

(21) Appl. No.: 10/540,831

(22) PCT Filed: Mar. 25, 2004

(86) PCT No.: PCT/FR2004/000736

§ 371 (c)(1),
(2), (4) Date: Jun. 24, 2005

(87) PCT Pub. No.: WO2004/091080

PCT Pub. Date: Oct. 21, 2004

(65) Prior Publication Data

US 2006/0049708 A1    Mar. 9, 2006

(30) Foreign Application Priority Data

Mar. 31, 2003  (FR) .................................. 03 50080

(51) Int. Cl.
*H02K 49/00* (2006.01)
(52) U.S. Cl. ........................................ 310/103; 310/93

(58) Field of Classification Search ............ 310/76–78, 310/92–93, 103, 105, 268
See application file for complete search history.

(56) References Cited

U.S. PATENT DOCUMENTS 3,553,507 A * 1/1971 Bessiere ...................... 310/93
5,044,228 A    9/1991 Rugraff

FOREIGN PATENT DOCUMENTS

FR       2 744 679       8/1997

* cited by examiner

*Primary Examiner*—Thanh Lam
(74) *Attorney, Agent, or Firm*—Berenato, White & Stavish

(57) ABSTRACT

An electromagnetic retarder (1) for a vehicle includes a disc (20), a first rotor (5) and a second rotor (6), the disc being arranged to couple the first rotor and the second rotor to a transmission shaft of a vehicle. In order to facilitate fitting of this transmission shaft on the electromagnetic retarder, the invention provides for positioning the disc on one of the two rotors in such a way that the disc is placed in a position offset longitudinally, with respect to an axis (21) of the retarder, towards one of the two rotors. The disc includes fastening means for fastening the disc on the corresponding rotor, which fastening means (22) are such that they are positioned between curved arms (9, 10) of the rotor.

8 Claims, 2 Drawing Sheets

ELECTROMAGNETIC RETARDER FOR A VEHICLE

FIELD OF THE INVENTION

This invention relates to an electromagnetic retarder for a vehicle. The object of the invention is to facilitate the fitting of such a retarder on a transmission shaft for transmitting rotational movement to at least one wheel of the vehicle, while increasing the performance of the retarder. The invention is more particularly directed to the field of trucks or lorries, automobiles and buses, that is to say motor vehicles of the "heavy" type, though it may also be applied in other fields.

STATE OF THE ART

An electromagnetic retarder enables a braking system of a vehicle to be assisted, especially for vehicles of the heavy type. A braking system may include brake pads which are arranged to be applied against at least one disc of a hub of a road wheel of a vehicle, so as to apply braking to the vehicle.

An electromagnetic retarder enables the speed of the vehicle to be reduced, so that the useful life of the braking system is increased and the system is made more reliable, especially following a long descent by a heavy type of vehicle such as a truck or a bus.

There are in existence several types of electromagnetic retarder. In particular, there are electromagnetic retarders of the axial type and electromagnetic retarders of the Focal (Trade Mark applied for) type. An electromagnetic retarder of the axial type is designed to be placed on a transmission shaft between a rear axle and a gearbox of the vehicle. In that case, the transmission shaft is in two parts, for mounting between those of the retarder. An electromagnetic retarder of the Focal type is designed to be placed directly on a transmission shaft on the output side of the gearbox or on the axle of the vehicle. The axle of a vehicle drives at least one road wheel, which road wheel drives at least one wheel of the same vehicle.

An electromagnetic retarder comprises at least one stator in the form of an inductor, together with at least one rotor which is an armature, with an airgap between these two parts. The inductor stator comprises for example a radial plate member. The inductor stator is adapted to carry, close to it and along one periphery, at least one winding. A winding is formed from at least one coil of wire, which is preferably of ferromagnetic material. The wire is wound around a core. Each of the cores, which are preferably made of ferromagnetic material, of each of the windings is terminated by a polar head which retains the winding on the stator.

The rotor armature is fitted in a plane parallel to a plane of the stator inductor. The rotor is arranged to rotate about an axis of the stator due to the transmission of rotational movement to the rotor by the transmission shaft of the vehicle. The rotor armature, which is preferably of ferromagnetic material, is arranged for the passage of magnetic lines of force produced by the windings carried by the stator when the latter are activated. The stator could however be an armature in the form of a stator, with the rotor being an inductor. The rotor would carry the windings in that case, as described for example in the document FR-A-2 627 913, hereinafter referred to as D1.

It is known to provide Focal type retarders as described in the document FR-A-2 577 537, hereinafter referred to as D2, comprising a stator inductor on either side of which there are a first rotor and a second rotor. To enable the transmission shaft to be fixed on this retarder, the retarder includes an intermediate disc or central plate. This intermediate disc is usually designed to connect the first rotor to the second rotor on the one hand, and to connect the first rotor and second rotor to the transmission shaft on the other hand, in such a way that the transmission shaft communicates rotational movement to each of the rotors of the retarder. Following this rotational movement, the first rotor and second rotor are arranged to turn about the axis of the stator, and this stator axis is coincident with an axis of the retarder. Thus, when the windings are excited, the retarder is caused to reduce the velocity of rotation of the transmission shaft by braking the rotational velocity of each of the rotors.

The intermediate disc described in the document D2 is in the form of an annular member disposed with a plane at right angles to the axis of the servomotor, and situated with an axis of the said annular ring coincident with the axis of the retarder. The disc is situated halfway between the first rotor and the second rotor. This intermediate disc is arranged to couple the first rotor to the second rotor through a first sleeve and a second sleeve respectively. In this type of retarder, the first rotor and the second rotor are each connected through curved arms to the first sleeve and second sleeve respectively. These two sleeves are assembled together by means of bolts or gudgeons which extends through bores formed in the sleeves. The intermediate disc or central plate is interposed between the two sleeves, enabling a precise airgap to be defined between the rotors and the stator.

Now certain buses have a very short transmission shaft, so that it can be difficult to fix such a shaft on a retarder of the Focal type in the way described above. Access from the transmission shaft to the intermediate disc is as difficult as the shaft is short.

In order to facilitate fitting of such a short shaft, it is known to provide another type of electromagnetic retarder, which is a retarder of the FL type, described more particularly in the document FR-A-2 744 679 (U.S. Pat. No. 5,487,481), comprising an intermediate tube which is also arranged to couple the first rotor to the second rotor. This intermediate tube is of hollow cylindrical circular form and extends, longitudinally with respect to the axis of the retarder, from the first rotor to the second rotor over a larger distance than the intermediate disc described in D2. The tube is secured directly on the first rotor and on the second rotor. The intermediate tube, being in the form of a circular cylindrical tube, then enables the transmission shaft to be fastened more easily on one end of the intermediate tube close to a corresponding rotor, so that it is not necessary to place the transmission shaft in a position which is situated halfway between the first rotor and the second rotor, but rather in a position close to either the first rotor or the second rotor.

As can be seen in FIG. 4 of the document FR-A-2 744 679, the intermediate tube has slots such that it has a certain amount of flexibility and is therefore able to undergo severe thermal stresses. Such a retarder does not have the stiffness of a retarder of the Focal type, which does not lend itself well to being fitted on a short shaft. It is therefore necessary to look for a compromise.

OBJECT OF THE INVENTION

In order to facilitate the fitting of the relatively short transmission shaft on an electromagnetic retarder for a vehicle, while improving the performance of the retarder, the invention envisages fastening a disc on one of the rotors. The disc is fixed on one of the rotors in such a way as to facilitate fastening of a short transmission shaft, while optimising the capacity to withstand the mechanical load and thermal load of the retarder. The first rotor and second rotor are accordingly fixed together through a central fastening ring, which enables an airgap to be adjusted between the two rotors.

The disc is positioned in such a way that it is offset, longitudinally with respect to the axis of the retarder, towards one of the two rotors. In order to fix the disc on one of the two rotors, the disc includes fastening means. These fastening means are preferably made in such a way that it is not necessary to modify the manufacturing references of rotors conventionally used in retarders of the Focal type. These fastening means may for example be ears which are formed with a through aperture, the said ears being able to extend from an external periphery of the disc. These ears may be designed for fastening members to extend through them.

In particular, these fastening members may be in the form of the gudgeons which are commonly used for connecting the first sleeve and second sleeve together, given that each sleeve is coupled to the rotor concerned by curved arms, and given also that the gudgeons are fitted between the arms which are formed by casting with the rotor and sleeve concerned. The said gudgeons are arranged to extend through bores which are drilled in each of the sleeves and in the central fastening ring. Nuts are fitted on the ends of the gudgeons for tightening up the sleeves. All the bores in all of these elements are aligned with each other in such a way that at least one gudgeon is able to extend through the retarder from the first sleeve to the second sleeve, passing through the central fastening ring. Thus, in the invention, at least one gudgeon can be used to retain the disc in position on the first rotor for example. For this purpose, the gudgeon is designed to extend through the ear of the disc while making use of the bores which already exist in the first sleeve, the central fastening ring and the second sleeve. In consequence it is unnecessary to modify the casting criteria used in the manufacture of each of these elements. The manufacturing cost of such a retarder is reduced accordingly. The gudgeon can have, at each of its ends, a threaded profile for fitting a nut on it. In addition, the gudgeon may have a shoulder which is arranged to come into engagement on one of the faces of the central fastening ring, being lodged within the thickness of the fastening ring or the thickness of the adjacent sleeve. The nuts are engaged respectively on one of the sleeves and on the disc, with a thrust ring interposed if required, thereby securing the two rotors together. In a modified version, bolts are used.

In another version, the said fastening means may consist of at least one projecting element extending from a face of one of the sleeves. This projecting element is made in such a way that an ear according to the invention may pass through it. As for the gudgeon, the said projecting element may be threaded at a distal end, so that a nut can be fitted on it to retain the disc between the first sleeve and the nut.

The fastening members are, finally, disposed between the arms of the corresponding rotor.

The invention accordingly provides an electromagnetic retarder for a vehicle, having at least one inductor, being a stator and adapted to carry at least one electromagnetic winding, a first rotor, being an armature, and a second rotor, being an armature, the said first rotor and second rotor being coupled together by means of a central fastening ring, each rotor being situated on either side of a plane defined by the stator, and at least one disc adapted to connect the first rotor and the second rotor to a transmission shaft of the vehicle, characterised in that the disc is fixed on one of the two rotors in such a way that it is positioned in longitudinal offset relationship, with respect to an axis of the retarder, towards that rotor.

BRIEF DESCRIPTION OF THE DRAWINGS

The invention will be understood more clearly on a reading of the following description and from an examination of the drawings which accompany it. The latter are presented by way of example only and are in no way limiting of the invention. In the drawings.

DESCRIPTION OF EMBODIMENTS OF THE INVENTION

Figure 1A:
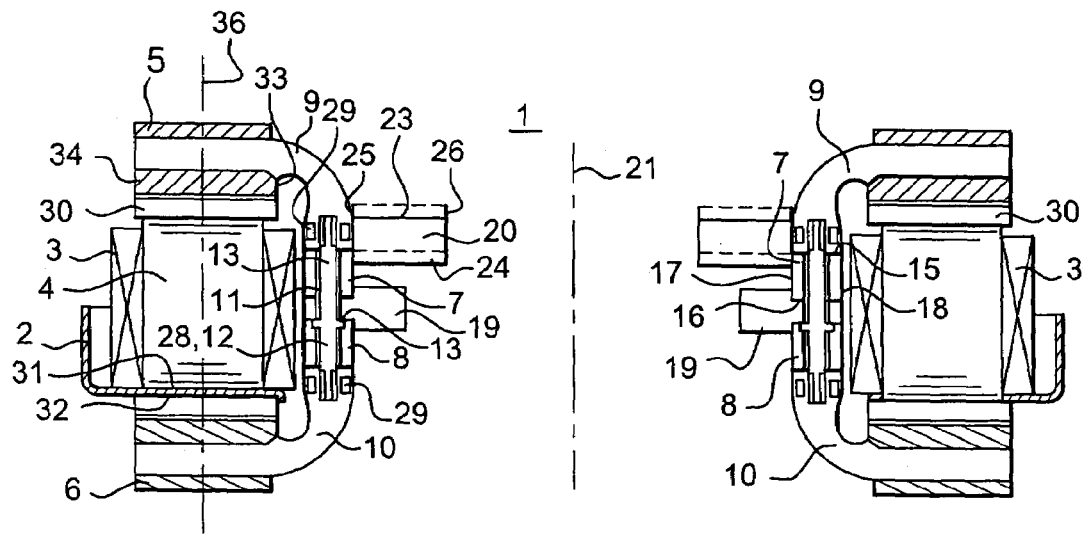
FIGS. 1a to 1c show a first view in cross section, a second view in cross section, and a third view in cross section, of an electromagnetic retarder for a vehicle according to the invention.
Figure 1B:
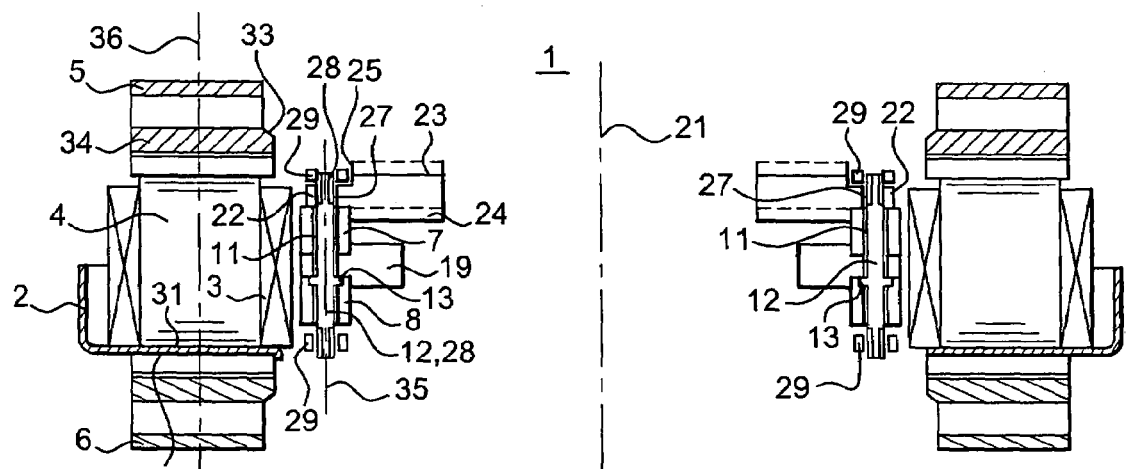
Figure 2:
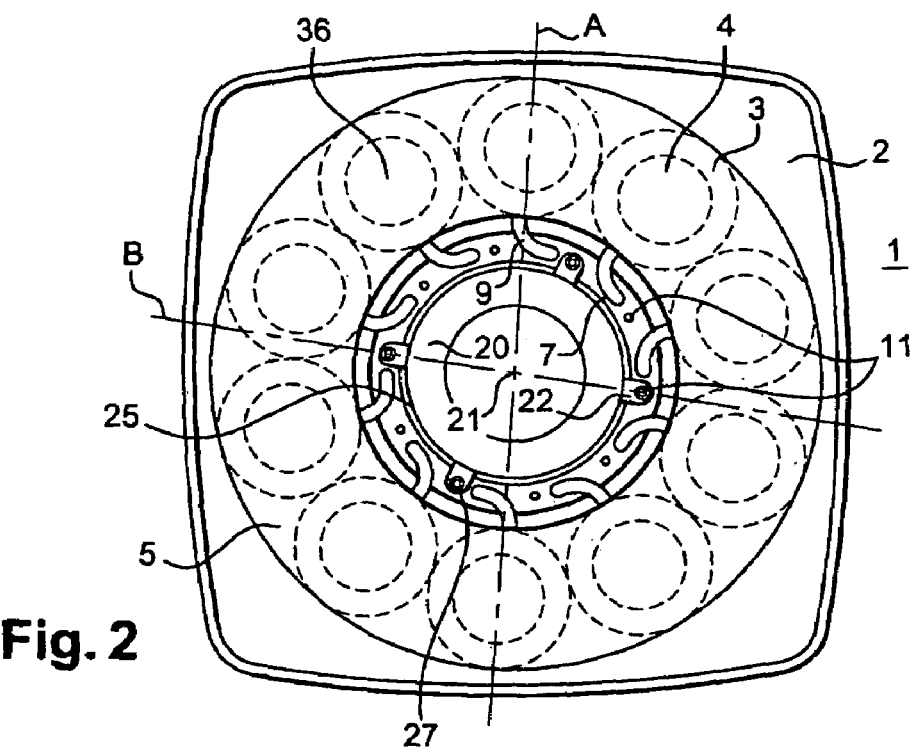
FIG. 2 is a longitudinal cross section of an electromagnetic retarder for a vehicle according to the invention.

FIGS. 1a and 1b show an electromagnetic retarder for a vehicle according to the invention, comprising at least one stator 2 which is the inductor, a first rotor 5 which is an armature, a second rotor 6 which is an armature, and a disc 20. More particularly, FIGS. 1a and 1b show, respectively, a transverse cross section through the retarder taken on an axis A and an axis B passing through the retarder, as shown in FIG. 2. The rotors 5 and 6 are preferably made of a ferromagnetic material, and the same is true of the radial plate portion of the stator 2.

The electromagnetic retarder in FIG. 1 is a retarder of the Focal type. This starter has a stator 2 on which at least one winding 3 is fixed. The winding consists of a coil of electromagnetic wire, formed around a core 4. The core 4, which is preferably of ferromagnetic material, has an axis 36 at right angles to a plane defined by the stator. The core is terminated by a polar head piece 30 in facing relationship with the rotor 5, and this head piece defines a plane parallel to the plane defined by the stator, so as to hold the winding on the stator in place. The stator 2, which in this example is in the form of a radial plate portion, best seen in FIG. 2, is arranged to be connected to the casing of an axle or of a gearbox, the retarder being cantilevered in the known way at the exit of the axle or gearbox.

The core 4, or each core, is fixed at one of its ends on the radial plate portion of the stator 2, which has at its outer periphery a perpendicular stiffening flange together with lugs (not shown) for fastening it to, for example, a cover member fixed with respect to the casing of the rear axle, or the casing of the gearbox, as can be seen for example in the documents U.S. Pat. Nos. 5,487,481 and 5,044,228.

The cores also have a head piece (not given a reference numeral) at the level of the radial plate portion of the stator, and in facing relationship to the rotor 6.

The head pieces 30 are secured, for example by screw fastening, on the hubs.

FIG. 2 shows a longitudinal cross section of an electromagnetic retarder. In the example shown in FIG. 2, the electromagnetic retarder has ten electromagnetic windings disposed in a circle one after the other about an axis 21 of the retarder, this axis 21 being parallel to the axis 36 of each of the windings. However, this electromagnetic retarder could have a greater or smaller number of windings.

The radial plate portion of the stator 2 is oriented transversely with respect to the axis 21.

Figure 1C:
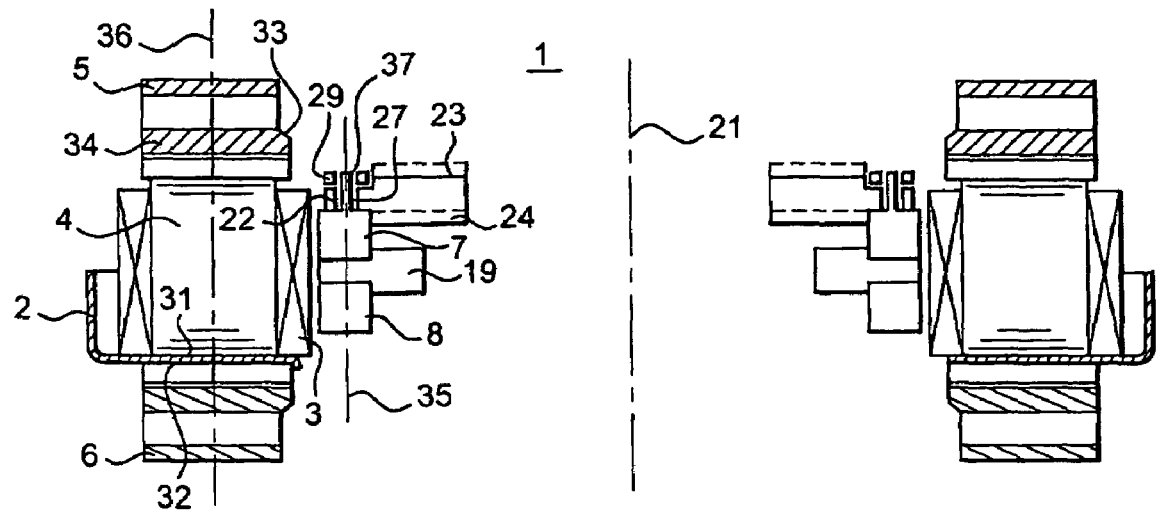

The windings and head pieces are overlaid by the first rotor 5 and by the second rotor 6, with an airgap between them, with each of the rotors, transversely oriented with respect to the axis 21, being positioned one with respect to the other in a plane defined by the first rotor 5 and in another plane defined by the second rotor 6, these planes being parallel to each other and parallel to the plane defined by the stator 2 in FIGS. 1a to 1c.

There is an airgap between the head pieces and the associated rotor 5 or 6.

The plane of the radial plate portion of the stator 2 delimits a first side 31 and a second side 32. The windings are placed on one of the two sides of the stator. The first side 31 is arranged to face towards the first rotor 5, while the second side 32 is arranged to be remote from the first rotor 5. In this example as shown in FIGS. 1a to 1c, the windings are located on the first side 31 of the stator.

The first rotor 5 and the second rotor 6 are fixed on a first sleeve, or ring, 7 and a second sleeve, or ring, 8, respectively, see FIGS. 1a and 1b. The sleeves 7 and 8 in this example are integral with, respectively, the first rotor 5 and the second rotor 6; the rotors with their associated sleeves are made by moulding. The first sleeve 7 and the second sleeve 8 are arranged to face each other and to be secured to each other by means of a central fastening ring 19. The central fastening ring 19 enables a precise airgap to be defined between the stator 2 and each of the rotors 5 and 6. For this purpose, the ring 19 has a reduced thickness at its outer periphery in order to define the airgap between the rotors and the stator.

The electromagnetic retarder also includes a disc 20 which is adapted to couple the first rotor 5 and the second rotor 6 to a shaft for transmitting the radial motion, in this example to at least one wheel of the vehicle (not shown). More precisely, one part of the cardan joint associated with the end concerned of the transmission shaft is fixed on the disc, and the same is true with the shaft associated with the gearbox or axle.

The disc 20 has for example holes for fasteners such as screws, for securing it on the fork of the cardan joint, which is coupled in rotation to the input shaft of the rear axle or to the output shaft of the gearbox, as can be seen in FIG. 1 of the document FR-A-2 744 679. The disc 20 accordingly has a zone for fastening it to the cardan joint, and in this example it is connected via the said cardan joint to the transmission shaft.

The transmission shaft thus enables the first rotor 5 and second rotor 6 to be driven in rotation about the axis 21 of the retarder and with respect to the stator 2. After the windings have been excited, a magnetic field exists in each of the rotors 5 and 6. This magnetic field has a tendency to oppose the rotational movement of the rotors. The magnetic field therefore causes the velocity of rotation of the rotors 5 and 6 to be reduced, or even causes rotation of these rotors 5 and 6 and of the transmission shaft to be stopped.

In accordance with the invention, the disc 20 is disposed in such a way that it is positioned so as to be offset, longitudinally with respect to the axis 21 of the retarder, towards one of the two rotors. More particularly, the disc 20 is positioned on one of the corresponding sleeves 7 or 8 of the rotor 5 or 6, according to the particular application.

Thus, in one embodiment the disc is positioned on the sleeve closer to the casing of the axle or gearbox, so that the transmission shaft is able to be made short, and so that axial size is reduced. In a modified version, the disc is positioned on the other sleeve, the transmission shaft being shortened. In that case, it is possible to fix the disc on the fork of the cardan joint which corresponds to the end of the transmission shaft. In all cases, the disc couples the rotors 5 and 6 to the transmission shaft either directly or indirectly.

In the example in FIGS. 1a to 1c, the disc 20 is positioned on the first sleeve 7 which corresponds to the first rotor 5. Thus, in that example, the disc 20 is positioned in facing relationship with an inner periphery such as 17 delimited by each of the sleeves 7 and 8, in a manner to be described below.

Each of the sleeves 7 and 8 has an inner periphery such as 17, and an outer periphery such as 18. Each of these peripheries 17 and 18 constitutes a face with a plane parallel to the axis 21 of the retarder. The inner periphery 17 of each one of the sleeves 7 and 8 is arranged to be close to the axis 21 of the retarder, and the outer periphery 18 of each of the sleeves 7 and 8 is adapted to be remote from the axis 21 of the retarder.

The disc also has an outer periphery 25 and an inner periphery 26. The outer periphery 25 of the disc is arranged to be located remote from the axis 21 of the retarder. The inner periphery 26 of the disc is adapted to be close to the axis 21. The outer periphery 25 of the disc 20 may have a diameter which is smaller than a diameter defined by the inner periphery 17 of the corresponding sleeve, in such a way that the outer periphery 25 of the disc 20 is located in facing relationship with the inner periphery 17 of the sleeve 7 or 8.

The disc 20 is fixed on one of the sleeves 7 or 8 by at least one fastening means 22, FIGS. 1b and 2. FIG. 1a shows a transverse cross section of the retarder passing outside the fastening means 22, while FIG. 1b shows a transverse cross section of the same retarder passing through the fastening means 22, in accordance with the invention.

The fastening means 22 may constitute an ear 22 which projects radially. An ear 22 may be formed on an extension of the material extending from the outer periphery 25 of the disc 20, FIGS. 1b and 1c. The ear 22 can extend from the outer periphery 25 of the disc 20, radially with respect to the axis 21 and in the direction away from the axis 21 of the retarder. The ear 22 is pierced by a central aperture 27. In the example of FIG. 2, the disc has four ears. However, the disc could have more of them, for example eight ears, in order to ensure improved fastening of the disc to the corresponding rotor.

In the example shown in FIG. 1b, the ears 22 are inserted on an upper face 15 of the first sleeve 7. Each of the sleeves 7 and 8 comprises, with respect to a plane at right angles to the axis 21 of the retarder, an upper face such as 15 and a lower face such as 16. The upper face 15 of each of the sleeves is arranged to be remote from the central fastening ring 19. The said ears 22 may extend from the outer periphery 25 of the disc 20, halfway between an upper face 23 and a lower face 24 of the disc 20. More precisely, the disc also defines an upper face 23 and a lower face 24, the upper face 23 being arranged to be remote from the central fastening ring 19, while the lower face 24 is arranged to be close to the central fastening ring 19. Alternatively, the ears 22 may extend away from a place on the outer periphery 25 which is close to the upper face 23 of the disc 20, or to a place on the outer periphery 25 close to the lower face 24 of the disc 20. FIGS. 1b and 1c show in broken lines the position of the disc 20 with respect to the sleeve in the case where the ears are positioned at a place on the outer periphery 25 of the disc which is close to the lower face 24 of the disc 20.

According to the position of the ears 22 on the outer periphery 25 of the disc 20, with respect to the upper face 23 and with respect to the lower face 24, the ears 22 enable the disc 20 to be either in centering engagement or otherwise, through its outer periphery 25, against the inner periphery 17 of the first sleeve 7. The disc 20 can be in engagement on another surface which is larger to a greater or lesser extent depending on the position of the outer periphery 25 of the disc 20 from which the ear 20 extends, as is indicated in broken lines in FIGS. 1*a* to 1*c*. This engagement surface, more or less large, enables the disc 20, if required, to become inserted at least partially into the sleeve 7, so as to increase a mechanical strength of such a retarder while increasing the stability of the retarder.

The ears 22 may be formed with a through hole 27 on an axis 35 parallel to the axis 21 of the retarder, FIGS. 1*b*, 1*c* and 2. This aperture 27 is made in such a way that a fastening member 28 is arranged to extend through it. A fastening member may consist of at least one gudgeon, such as 12, like that which is conventionally used for fastening the first sleeve to the second sleeve by passing the fastening ring 19, FIGS. 1*a* and 1*b*. The gudgeon 12 is arranged to extend through the various parts, via bores 11, the bores being aligned with respect to each other and being formed within a thickness of the first sleeve, the second sleeve and the central fastening ring 19, FIG. 1*a*. By using such bores in the invention, it is not necessary to change any casting criteria used in order to make a retarder of this kind. In the invention, the holes formed by the bores are all put close together in order to enable the disc 20, the two sleeves 7 and 8 and the fastening ring 19 to be secured together, as shown in FIG. 1*b*. The rotors are not modified.

The retarder has at least some bores for elements constituting the retarder, the number of these bores being enough to fasten the ears. The term "elements constituting the retarder" is to be understood to mean the first sleeve, the second sleeve and the central fastening ring. Preferably, the retarder has a number of bores, for each of the elements that form it, which is equal to four, so that four ears constituted by the disc according to the invention are able to be fastened on a corresponding sleeve.

The gudgeon 12 has a shoulder 13 which bears against one of the faces of the central fastening ring 19, while on either side of this shoulder 13 it has two smooth portions, each of which is extended by a threaded fastening portion for a fastening nut 29. In this example, the shoulder 13 is interposed between the sleeve 8 and the ring 19. For this purpose, the bore in the sleeve 8 has a change of diameter for accommodating the shoulder 13. In a modified version, it is the fastening ring 19 that has this change of diameter. In all cases, a ring of low thickness may be interposed between the fastening ring 19 and the sleeve 8, in order to adjust the airgap between the stator and the rotors in a precise manner.

In a further modified version, the fastening member consists of a screw, the head of which bears on the ear 22. This screw extends through the ear concerned, and the sleeve 7 and ring 19, with its threaded portion being screwed into the sleeve 8, which accordingly has an internal thread.

In another modification, the screw is replaced by a bolt.

In a further modified version, the fastening member can also define a projecting element 37 as shown in FIG. 1*c*. This projecting element 37 is made in such a way that it is able to extend also through the ear 22, passing through the aperture 27 in this ear. In this connection, the first sleeve 7 may be provided with at least one projecting element 37 which is arranged to be inserted into the aperture 27. At least one projecting element 37 may be formed extending from the upper face 15 of the first sleeve 7. Preferably, the projecting element 37 extends at right angles to the plane defined by the upper face 15, see FIG. 1*c*. The projecting element 37 could also extend from the inner periphery 17 of the first sleeve 7, first at right angles with respect to the axis of the retarder and then longitudinally with respect to the axis of the retarder.

The projecting element 37 may be threaded at least at its distal end, so that it is possible to screw a nut on the projecting element 37.

The projecting element 37 consists for example of a screw, the head of which is encapsulated in the sleeve 7 by in situ moulding. The projecting elements 37 are then offset circumferentially with respect to the gudgeons 12, and are located between the arms, to be described later herein, of the rotor concerned. It will be noted that the geometry of the rotors is not modified.

In order to mount the disc 20 on the corresponding sleeve, it is then sufficient to position the disc 20 with each of the ears 22 placed in facing relationship with each of the fastening members 28, 12, 37 at a location close to one of the sleeves, and then to pass the fastening members 28, 12, 37 through the aperture 27 in the ears 22, after which the fastening members 28, 12, 37 are screwed up with the aid of a nut 29, so as to retain the disc 20 on the corresponding sleeve.

For fastening of the ears 22 on the first sleeve 7, the ears are formed from the outer periphery 25 of the disc 20 in such a way that at least one ear 22 is arranged to be interposed between the curved arms 9 and 10 of the rotors 5 and 6, see FIG. 2.

In this connection, the first rotor 5 and the second rotor 6 are connected on the first sleeve 7 and on the second sleeve 8 respectively, by means of at least one curved arm 9, 10. The first rotor 5 and the second rotor 6, with their arms 9 and 10 respectively, are made integrally with the respective sleeves 7 and 8. One curved arm is formed by an extension of the material defined by the rotor, and has a tendency to become inclined towards the stator with respect to a plane defined by the rotor. The curved arm of each of the rotors tends to extend radially towards the axis 21 of the retarder, while tending to incline towards the stator from an inner periphery 33 of each rotor.

Each rotor 5, 6 includes an Annular element having an inner periphery, such as 33, and an outer periphery such as 34. The inner periphery 33 of each of the rotors 5 and 6 is a face which is arranged to be close to the axis 21 of the retarder. The outer periphery 34 of each of the annular portions of the rotors is a face which is arranged to be remote from the axis 21 of the retarder. On the side opposite to the stator, each annular rotor portion has fins, at least some of which are extended by the arms. These fins are fixed with respect to a felloe (not given a reference numeral), which is parallel to the annular portion of the rotor so as to constitute a fan for cooling the retarder. In accordance with one feature of the invention, the ears and the fastening members are fitted between the arms, which enables quick and easy assembly to be achieved. Advantage is taken of the space available between the arms, while standard rotors, of the same type as those described in the document D2, can be used with advantage. The fastening means 22, in the form of ears in the drawings, can of course take some other form. For example, they may consist of radially projecting lugs.

The said fastening means may be attached, for example by welding, on the disc. In all cases they are fixed to the disc.

The disc is not necessarily flat. Thus it may have an inclined portion between the fastening means 22, such as the ears, together with its fastening zone, mentioned above, for fastening it to the cardan joint.

Each finned rotor, each arm, and each sleeve, are made by moulding in the present case. In the preferred example shown in FIG. 2, the first rotor has ten arms, such as the arms 9. Each of these arms 9 is arranged to extend from the inner periphery 33 of the annular portion of the first rotor, radially, and towards the axis 21 of the retarder so as to be fixed on the first sleeve 7. The same is true for the second rotor 6. In the example shown in FIGS. 1*a* and 1*b,* each of the arms 9 and 10 of each of the rotors 5 and 6 is fixed on the upper face 15 of the corresponding sleeve 7 or 8.

It will be appreciated that the solution is simple and inexpensive as compared with the solution described in the document U.S. Pat. No. 5,044,228. In this connection, the central fastening ring 19 has only the function of acting as a spacer between the two sleeves 7 and 8 and of centring the rotors. This ring 19 is more simple and inexpensive than the tubular insert with an annular ring described in the above mentioned document, and seen best in FIG. 2 of that document. In addition, that ring is subjected to reduced mechanical applied forces, which is favourable for achieving a precise airgap, controlled preferably with the aid of at least one thin ring, between the heads of the stator and the rotors 5 and 6 oriented transversely with respect to the axis 21. Good centring of the rotors is also obtained.

As compared with the document FR-A-2 744 679, a precise air gap, good centring of the rotors and increased rigidity are obtained.

In the embodiment described, the transmission shaft is interposed operatively between the gearbox and the rear axle, enabling the rear wheels of the vehicle to be driven. In a modified version, this transmission shaft is interposed operatively between the gearbox and a front wheel of the vehicle.

The transmission shaft can be made short.

The invention is also applicable to vehicles with four road wheels.

The invention claimed is:

1. A focal electromagnetic retarder (1) for a vehicle, the retarder comprising:

at least one inductor (2) being a stator and adapted to carry at least one electromagnetic winding (3), a first rotor (5) being an armature, and a second rotor (6) being an armature, the first rotor and the second rotor being coupled together by means of a central fastening ring (19), each rotor being situated on either side of a plane defined by the stator (2), and a single disc (20) separate from the central fastening ring (19) and adapted to connect the first rotor and the second rotor to a transmission shaft of the vehicle, wherein the disc is fixed to only one of the two rotors in such a way that it is positioned in longitudinal offset relationship with respect to an axis (21) of the retarder towards that rotor.

2. The focal retarder according to claim 1, wherein the first rotor and the second rotor are fixed to a first ring (7) and to a second ring (8) respectively, the first ring and the second ring are coupled together by the central fastening ring (19), and the disc (20) is fixed to only one of the first and second rings by fastening means (22).

3. The focal retarder according to claim 2, wherein the fastening means constitute at least one pierced ear (22) formed on the disc (20).

4. The focal retarder according to claim 3, wherein the retarder has four ears.

5. The focal retarder according to claim 3, wherein the ear is pierced in the centre.

6. The focal retarder according to claim 2, wherein the disc has an outer periphery (25) remote from an axis (21) of the retarder and an inner periphery (26) close to the axis of the retarder, and wherein the fastening means extends radially from the outer periphery of the disc.

7. The focal retarder according to claim 2, wherein the first rotor and the second rotor are connected to the first ring and the second ring through interposed arms (9, 10), and wherein the fastening means (22) is interposed between the arms of one of the rotors.

8. The focal retarder according to claim 2, wherein the one of the first and second rings on which the disc is arranged to be fixed is provided with at least one projecting element (37) which is adapted to receive the corresponding fastening means.

* * * * *